United States Patent [19]

Petty, Jr.

[11] Patent Number: 4,568,652

[45] Date of Patent: Feb. 4, 1986

[54] SOLUBLE ADDITIVES TO IMPROVE HIGH TEMPERATURE PROPERTIES OF ALUMINA REFRACTORIES

[75] Inventor: Arthur V. Petty, Jr., Tuscaloosa, Ala.

[73] Assignee: The United States of America as represented by the Secretary of the Interior, Washington, D.C.

[21] Appl. No.: 660,666

[22] Filed: Oct. 15, 1984

[51] Int. Cl.$^4$ ............................................. C04B 35/10
[52] U.S. Cl. ..................................... 501/127; 264/60; 501/128; 501/153
[58] Field of Search ....................... 501/127, 128, 153; 264/60

[56] References Cited

U.S. PATENT DOCUMENTS

| | | | |
|---|---|---|---|
| 3,192,058 | 6/1965 | Davies et al. | 501/127 |
| 3,734,767 | 5/1973 | Church et al. | 501/127 |
| 3,789,096 | 1/1974 | Church et al. | 264/60 |
| 4,397,963 | 8/1983 | Morgan | 501/153 |

Primary Examiner—Helen M. McCarthy
Attorney, Agent, or Firm—E. Philip Koltos; Thomas Zack

[57] ABSTRACT

A method for improving the high temperature properties of 42 to 70 percent by weight $Al_2O_3$ containing alumina refractories by adding thereto a soluble metal compound and firing to at least 1450° C. for a time sufficient to convert the soluble metal compound to a refractory oxide or phase and for the refractory oxide or phase to react with the non-$Al_2O_3$ constituents of the refractory for preventing or reducing the presence or effect of detrimental compounds or phases on the high temperature properties of the refractory. The resulting relatively low $Al_2O_3$ content, porous, alumina refractory includes within its pores from 1 to 10% by weight of a refractory oxide or phase and is characterized by high temperature property values substantially greater than the corresponding values for the same refractory body without said refractory oxide or phase in its pores.

14 Claims, No Drawings

SOLUBLE ADDITIVES TO IMPROVE HIGH TEMPERATURE PROPERTIES OF ALUMINA REFRACTORIES

TECHNICAL FIELD

The present invention relates to alumina refractories and, more particularly, to a method for improving the high temperature properties of alumina refractories involving the use of soluble additives followed by firing to relatively high temperatures.

BACKGROUND ART

There are relatively few mineral commodities that are suitable, by virtue of high melting point, mineral stability and physical and chemical properties, for use in refractory material applications above 1000° C. Alumina ($Al_2O_3$) easily satisfies all of these requirements and, due to its excellent chemical inertness, finds applications in many diverse temperatures and environments. For example, alumina refractories containing from 30 to 99 percent by weight $Al_2O_3$ are widely used in high temperature processing and production operations, such as high temperature metallurgical, glass and cement processes.

In most all alumina refractories the bulk of the non-$Al_2O_3$ material is silica ($SiO_2$). Alumina also, typically, includes a number of impurities, such as free iron, titania and alkalies. All of the non-$Al_2O_3$ constituents reduce the refractoriness of $Al_2O_3$ by forming low temperature melting phases or glasses which limit the usefulness of the alumina. The use of alumina refractories is also limited, at times, due to contact with other external materials such as glasses or metallurgical slags. Generally, as the $Al_2O_2$ content increases, there is a corresponding decrease in associated detrimental oxides and other impurities. Therefore, as the intended operating temperature of the alumina refractory increases, or as the operating atmosphere becomes more reactive, higher $Al_2O_3$ content refractories must be used in order to retain the desired refractory properties and to minimize the detrimental effects caused by phase or glass formation by the non-$Al_2O_3$ constituents. For example, at high temperatures there is a reaction between $SiO_2$ and $Al_2O_3$ resulting in the formation of mullite ($3Al_2O_3.2SiO_2$), which has a melting point of 1850° C. As the $Al_2O_3$ content drops below 70%, there is more and more unreacted, i.e., excess, $SiO_2$, which may be present in the form of alpha quartz, cristobalite, or combined with impurities to form an amorphous glassy phase. If present as a glassy phase it can limit the high temperature properties of the refractory. If present as cristobalite, or even as quartz which is convertible to cristobalite above 1200° C. in the presence of mineralizers, the cristobalite undergoes a low temperature inversion, accompanied by a 1% linear expansion, which results in poor spall resistance. The other impurities form low-melting secondary crystalline phases or glass phases which soften at high temperatures, causing deformation or loss of strength.

It would, of course, be desirable to utilize alumina refractories containing no non-$Al_2O_3$ impurities. However, small quantities of these impurities are found in all but the most expensive refractory products and, unless very high $Al_2O_3$ content refractory grade bauxite (greater than 85% $Al_2O_3$) is readily available, the presence of excess silica will always be a problem. Although the world's reserves of refractory grade bauxite are extensive, due to politico-economic considerations, these reserves may not always be available to the United States. Therefore, an effort has been made in the United States to enhance domestic self sufficiency and reduce the United States dependence on imported refractory grade bauxite by trying to locate domestic mineral deposits of refractory grade bauxite, chemically beneficating clays and other $Al_2O_3$ containing domestic resources to obtain high-$Al_2O_3$ concentrate, and recycling high-$Al_2O_3$ refractories. Another approach is to immobilize the impurities, e.g., tie them up by reaction, to prevent their formation of amorphous, glassy phases at grain boundaries and/or to stabilize the excess silica to prevent cristobalite formation in order to improve the high temperature properties of lower content $Al_2O_3$ (42–70% $Al_2O_3$) refractories produced from readily available domestic resources to the point where they could be substituted for the higher-$Al_2O_3$ content refractories.

One attempt to improve the high temperature properties of alumina and other refractories is disclosed in U.S. Pat. No. 3,192,058 to Davies et al wherein a water insoluble, high purity oxide of chromium, particularly $Cr_2O_3$, in finely divided particulate form is added to a refractory metal oxide aggegrate, such as alumina, during refractory batch forming. Although properties such as density, high temperature dimensional stability and slag resistance are purportedly increased, the method suffers from the need for grinding, sizing, batching and homogeneous mixing of particulate materials and for treating the refractory at the aggregate stage, rather than at desired stages after it is at least preliminarily formed. In U.S. Pat. Nos. 3,734,767 and 3,789,096 to Church et al a ceramic treatment process is disclosed for enhancing the hardness of a porous alumina refractory oxide base material by impregnating the porous body with a water soluble metal salt which is convertible to an oxide by low temperature curing, normally at temperatures less than 1000° F. The purpose of the Church et al process is to form a new microcrystalline structure or a very close bond between the added oxide and the refractory oxide base material for providing the desired high hardness. According to Church et al the process is desirable for use on a substantially pure alumina, 85–90% $Al_2O_3$, and is not at all suitable on silica. Therefore, the Church et al process would not be useful on a less than 70% $Al_2O_3$ refractory, since such is not substantially pure and contains substantial amounts of silica. Moreover, there is no teaching in Church et al of how to immobilize or stabilize the silica, titania, iron or alkali impurities which form the high temperature deleterious phases. Rather, the object of Church et al is merely to add metal oxides to the alumina structure, as is evidenced by the low temperature curing which assures that the oxides do not further react with the alumina impurities.

It is, therefore, the purpose of the present invention to provide a simple, efficient, effective and relatively low cost method for improving the high temperature properties of relatively low-$Al_2O_3$ content alumina refractories.

DISCLOSURE OF THE INVENTION

In one aspect of the present invention this is accomplished by providing a method for improving the high temperature properties of domestically available, porous, lower alumina content refractories having an $Al_2O_3$ content in the range from about 42 to 70% $Al_2O_3$ by weight by immobilizing and/or stabilizing the non-$Al_2O_3$ silica and impurity content thereof to prevent or minimize the formation of lower melting crystalline and glassy phases which deleteriously affect the high temperature characteristics of the alumina.

In another aspect of the present invention this is accomplished by providing a method for improving the high temperature properties of alumina containing from 42 to 70% $Al_2O_3$ by weight by adding thereto small amounts of soluble compounds which react with impurities in the alumina to form high melting refractory compounds which improve the strength and/or chemical resistance of the alumina at high temperatures.

In another aspect of the present invention there is provided a method of treating a porous, alumina refractory body having an $Al_2O_3$ content in the range from about 42 to 70% $Al_2O_3$ by weight for preventing the non-$Al_2O_3$ constituents of the body from detrimentally affecting the high temperature properties of the alumina refractory by impregnating the refractory body with a solution of a water soluble metal compound capable of converting to a refractory phase, such as a refractory oxide, on heating and heating the impregnated body to a temperature of at least about 1450° C. but less than the melting temperature of the alumina refractory body for a period of time sufficient to convert the impregnated compound to a refractory oxide or phase and for the oxide or phase to react with the non-$Al_2O_3$ constituents of the body and, in some instances with the $Al_2O_3$ as well, for preventing or reducing the presence of high temperature property detrimental compounds or phases.

In another aspect of the present invention there is provided a method of adding a water soluble metal compound to a refractory dry mix having an $Al_2O_3$ content in the range from about 42 to 70% $Al_2O_3$ by weight prior to pressing, extruding, or otherwise fabricating a refractory shape. On firing to at least 1,450° C., the soluble metal compound is converted to a refractory oxide or phase which reacts with the non-$Al_2O_3$, and in some instances with the $Al_2O_3$, constituents of the body and thus prevents or reduces the effect of detrimental compounds or phases on the high temperature properties of the refractory body.

In another aspect of the present invention there is provided a method of adding a water soluble metal compound to a refractory castable, ramming, or gunning mix having an $Al_2O_3$ content in the range from about 42 to 70% $Al_2O_3$ by weight prior to casting, ramming, or gunning the material into a monolithic refractory shape. On firing to at least 1,450° C., the soluble metal compound is converted to a refractory oxide or phase which reacts with the non-$Al_2O_3$, and in some instances with the $Al_2O_3$, constituents of the body and thus prevents or reduces the effect of detrimental compounds or phases on the high temperature properties of the monolithic refractory shape.

In still another aspect of the invention the water soluble compound desirably includes a compound of molybdenum or chromium.

BEST MODE FOR CARRYING OUT THE INVENTION

In accordance with the method of the present invention it has been found that domestically available low $Al_2O_3$ content alumina refractories containing 42–70% $Al_2O_3$ by weight can be processed to dramatically improve the high temperature refractory properties, including hot modulus of rupture (MOR), deformation under load (hot load), slag resistance and spall resistance, to the point that they can be substituted in service for higher $Al_2O_3$ content alumina refractories presently requiring imported refractory grade bauxite.

The starting material alumina refractories preferred in accordance with the present process are low to moderate $Al_2O_3$ content alumina refractories such as are readily available within the United States. Such refractories typically have an $Al_2O_3$ content of 42 to 70% by weight; an apparent porosity of from about 11 to 19%, more usually 12 to 16%; and contain substantial amounts of non-$Al_2O_3$ constituents [such as 25 to 55% by weight silica, present either as free $SiO_2$ or as mullite ($3Al_2O_3 \cdot 2SiO_2$); 1 to 2% by weight iron, usually present as iron oxide ($Fe_2O_3$); 1 to 3% by weight titania ($TiO_2$); 0.1 to 2.5 percent by weight alkalies, such as $Na_2O$, $K_2O$, $Li_2O$; and lesser amounts of alkaline earths, such as lime (CaO) and magnesia ($M_gO$)]. X-ray diffraction analysis of these alumina refractories indicate that the starting materials contain, as mineral phases, a major amount of mullite, from trace to major amounts of cristobalite, amorphous, glassy phases, and detectable quantities of quartz and/or rutile. Other mineral phases which may be present are not detectable by X-ray diffraction due to the small quantities involved.

It is well known that these starting material alumina refractories have limited high temperature applications. It is believed that the poor high temperture performance is due primarily to the formation by the non-$Al_2O_3$ constituents of low melting secondary crystalline phases or amorphous glassy phases which soften at high temperatures, causing deformation or loss of strength. Excess free silica, in particular, tends to form low melting glassy phases which have a detrimental effect on high temperature performance. Even free silica in the form of quartz can pose a problem in the presence of mineralizers which cause the quartz to be converted to cristobalite at temperatures above 1200° C. As is well known, the presence of cristobalite can be very detrimental since it undergoes a low temperature inversion, accompanied by a 1% linear expansion, which results in poor spall resistance.

The foregoing and other problems associated with the use of low $Al_2O_3$ content, 42 to 70%, alumina refractories at high temperatures can be overcome or at least significantly reduced by treating the refractories in accordance with the method of the present invention, according to which the refractories are vacuum impregnated or soaked with a water soluble compound of a metal, preferably a salt or oxide, which, on subsequent heating to at least about 1450° C., decomposes or chemically reacts and is converted to refractory oxides or phases which, in turn, react with the non-$Al_2O_3$ constituents to prevent or reduce the formation of lower melting glassy phases during high temperature service. The refractory oxides or phases also react to form high-temperature secondary phases at grain boundaries; react with free cristobalite to eliminate it from the refractory; and, react with the surface of large, dense grains to reduce wettability by, and thereby increase refractory resistance to, external glasses and slags.

The alumina refractory, in accordance with the present invention, can be vacuum impregnated or soaked at various stages of production and, because the impregnant is a water soluble compound, impregnation accomplishes homogeneous introduction and distribution of the impregnant, permitting the use of smaller quantities of impregnant and reduced energy usage in order to achieve the desired reactions. Impregnation is desirably accomplished by placing a brick or other desired shape of the alumina refractory in a vacuum chamber, evacuating the chamber, backfilling the chamber with impregnant solution sufficient to completely submerge the refractory, soaking the refractory for a short time, raising the pressure in the chamber to atmospheric, and siphoning off the liquid. The refractory is permitted to drain and dry for about 24–48 hours and is then heated to a temperature of at least 1450° C., with a 48 hour heating-cooling cycle, to permit the desired conversion to refractory oxides or phases and reaction of the oxides or phases with the non-$Al_2O_3$ constituents of the refractory. To prevent softening, etc., the refractory is never heated to above the melting temperature during the impregnating-drying-heating cycle. Depending upon the desired degree of impregnation, the impregnating-drying-heating cycle can be repeated as many times as desired. It has been noted that the amount of impregnant taken up by the refractory, as measured by weight gain, increases linearly with the number of successive impregnations for at least three cycles. Depending upon the refractory employed, as impregnations continue the weight gain levels off as pore volume decreases and bridges form between interconnecting pores.

The water soluble compound can also be introduced by simply soaking the porous $Al_2O_3$ brick in a saturated or substantially saturated solution containing the metal ions. Soaking times ranging from 5 to 30 min are sufficient for standard size brick measuring 9 by 4.5 by 2.5 in. Preheating the bricks to temperatures ranging from 100° to 500° C. can also be employed. The water soluble compound can also be added to a dry mix refractory material prior to pressing, extruding, or otherwise fabricating a refractory shape. The water soluble compound can also be added to a castable refractory being prior to casting, ramming, or gunning to produce a monolithic refractory shape. Following any of the above techniques, subsequent heating to temperatures of at least 1,450° C. allows the soluble compounds to convert to refractory oxides or phases and react with the non-$Al_2O_3$ constituents, thus improving the high temperature refractory properties of the resultant refractory shape.

The high temperature property improvements which are the desired benefits of the present invention can be achieved by utilizing an impregnant solution which introduces chromium, chromium-iron, zirconium, calcium, or molybdenum ions into the alumina refractory. The impregnant solution is desirably a chloride, oxide, nitrate, acetate or other highly water soluble, relatively high-temperature stable salt or oxide or an acid of one or more of the above ions. In order to maximize the concentration of additive ions introduced into the alumina refractory, it is preferred that the impregnant solution be saturated or substantially saturated. It has been found that the beneficial effects of the chemical impregnation-heating method of the present invention are substantially completely achieved after two impregnations and subsequent impregnations only marginally improve high strength properties. Therefore, additions of from 1 to 10%, desirably 3 to 10%, by weight of secondary refractory oxides in soluble form to alumina refractories appear to be the practical optimum concentration range for improving the high temperature properties of the alumina refractories.

The practice of the method of the present invention and the benefits deriving therefrom will become apparent from the following illustrative examples.

EXAMPLE I

Three commercially available refractory bricks were chosen as representative of those having alumina contents between 42 and 70% $Al_2O_3$ and porosities ranging from 12 to 16%. Compositions and properties based on manufacturers data sheets are summarized in Table 1.

TABLE 1

|  | Commercial A | Refractory B | Brick C |
|---|---|---|---|
| Chem. anal., wt %: | | | |
| Alumina ($Al_2O_3$) | 41.9 | 58.0 | 69.2 |
| Silica ($SiO_2$) | 53.2 | 38.0 | 26.2 |
| Titania ($TiO_2$) | 2.2 | 2.4 | 2.9 |
| Iron oxide ($Fe_2O_3$) | 1.0 | 1.3 | 1.3 |
| Lime (CaO) | 0.2 | 0.1 | 0.1 |
| Magnesia (MgO) | 0.3 | 0.1 | 0.1 |
| Alkalies* | 1.2 | 0.1 | 0.2 |
| Physical property: | | | |
| Bulk density (lb/ft$^3$) | 144–148 | 156–160 | 157–161 |
| Apparent porosity (%) | 11–14 | 12–16 | 15–19 |
| Cold crushing strength (klb/in$^2$) | 1.8–3.0 | 7.0–10.0 | 6.0–9.0 |
| MOR**(klb/in$^2$) | .7–1.0 | 2.3–3.3 | 1.7–2.4 |
| Hot load test*** (% deform) | 1.0–3.0 | 0.1–0.5 | 0.4–1.0 |

*($Na_2O$ + $K_2O$ + $Li_2O$)
**Modulus of Rupture (room temperature)
***(25 lb/in$^2$ to 1,450° C. (2,640° F.))

A number of exemplary impregnant solutions were prepared as shown in Table 2. Oxides and salts were chosen primarily because of their high water solubilities and relative high temperature stability.

TABLE 2

| Salt | Solution concentration, g/L of $H_2O$ | Residual oxide following heating |
|---|---|---|
| Chromium trioxide ($CrO_3$) | 1,000 | $Cr_2O_3$. |
| Chromium trioxide ($CrO_3$) plus ferric chloride ($FeCl_3.6H_2O$) | 500-$CrO_3$ 1215.-$FeCl_3.6H_2O$ | $Cr_2O_3$ + $Fe_2O_3$ |
| Chromium trioxide ($CrO_3$) plus ferric chloride ($FeCl_3.6H_2O$) | 1000-$CrO_3$ 1215.-$FeCl_3.6H_2O$ | $Cr_2O_3$ + $Fe_2O_3$ |
| Ziroconyl chloride ($ZrOCl_2.XH_2O$) | 500 | $ZrO_2$ |
| Calcium nitrate ($Ca(NO_3)_2.XH_2O$) | 2,600 | CaO |
| Molybdenum trioxide ($MoO_3$) | 200* | $Mo_2O_3$ |

*in $NH_4OH$

A stainless steel vacuum chamber was used for the impregnation. The bricks were placed in the chamber on a wire mesh platform. The top was secured, and a mechanical vacuum pump was used to evacuate the chamber. Once minimum pressure of 0.1 Torr was achieved, the pump was run for 20 min. to remove air trapped in internal pores of the brick. A valve was then closed, isolating the chamber from the pump, and the chamber was backfilled with solution until the samples were completely submerged. Soaking continued for 15 min., after which the pressure was raised to 1 atm and the liquid was siphoned off. The bricks were allowed to drain and air-dry at ambient temperature and pressure for at least 24 hours, placed in a dryer at 110° C. for an additional 24 hours and then fired in an electric furnace to 1,450° C. with a 48-hour heating-cooling cycle. Bricks having the compositions A, B, C from Table 1 were impregnated one, two and three times with the drying-firing schedule described above completed after each impregnation.

EXAMPLE II

Percent absorption, percent apparent porosity and bulk density were determined on the as-furnished, untreated commercial refractory bricks A, B and C from Table 1 using the 5-hour boil test, ASTM C 373-72. The results are summarized in Table 3 and are in agreement with the ranges furnished by the manufacturer (see Table 1).

TABLE 3

|  | Brick A 42% $Al_2O_3$ | Brick B 58% $Al_2O_3$ | Brick C 70% $Al_2O_3$ |
|---|---|---|---|
| Absorption, % | 5.19 | 6.43 | 6.52 |
| Apparent porosity, % | 12.01 | 15.61 | 16.43 |
| Bulk density, lb/ft$^3$ | 145 | 153 | 157 |

EXAMPLE III

Test sets consisting of six samples of the 42-, 58-, and 70%-$Al_2O_3$ bricks (A, B and C from Table 1) were impregnated three successive times in the solutions listed in Table 2. Following each impregnation, after drying, firing and cooling, the samples were weighed and the percent weight gain was calculated. Similar values were obtained for all three refractory types. Table 4 summarizes the average results for the 42- and 70% $Al_2O_3$ refractories (A and C from Table 1).

TABLE 4

| Additive | 1 impreg. | 2 impreg. | 3 impreg. |
|---|---|---|---|
| 42% $Al_2O_3$ | | | |
| Calcium | 1.02 | 1.87 | 2.75 |
| Chrome | 2.53 | 4.45 | 7.76 |
| Chrome-iron 1 | 1.36 | 2.83 | 3.81 |
| Chrome-iron 2 | 2.12 | 3.76 | 6.44 |
| Zirconium | 1.11 | 2.05 | 2.85 |
| 70% $Al_2O_3$ | | | |
| Calcium | 1.14 | 2.51 | 3.78 |
| Chrome | 2.88 | 6.21 | 10.37 |
| Chrome-iron 1 | 1.78 | 3.40 | 5.22 |
| Chrome-iron 2 | 2.54 | 5.30 | 7.19 |
| Zirconium | 1.39 | 2.51 | 3.93 |

Table 4 indicates several trends to be apparent. First, the weight gain following impregnation is directly related to the molecular weight of the impregnant (i.e., $Cr_2O_3$ with a molecular weight of 152 results in a much larger weight gain than does CaO with a molecular weight of 56). Second, the weight gain is directly related to the apparent porosity of the brick (i.e., without exception, the 70% $Al_2O_3$ brick, with an apparent porosity of 16.43%, showed a larger weight gain than did the 42% $Al_2O_3$ brick with an apparent porosity of 12.01%). Third, the weight gain increases linearly with the number of successive impregnations. If impregnations continued, this weight gain would level off as pore volume decreased and bridges formed between interconnected pores.

EXAMPLE IV

Following three successive impregnation cycles, cold compressive strength measurements were made on each sample. The average results for each as-received and treated brick are given in Table 5. High room temperature compressive strengths often indicate the formation of excessive glassy phase at the grain boundaries, which results in very poor high temperature properties. Table 5 shows that impregnation had no significant effect on the room temperature strengths of the sample $Al_2O_3$ refractories.

TABLE 5

| Average cold compressive strength (psi) | | | |
|---|---|---|---|
|  | 42% $Al_2O_3$ | 58% $Al_2O_3$ | 70% $Al_2O_3$ |
| None (as received) | 8,400 | 14,400 | 10,900 |
| Calcium | 10,900 | 12,800 | 13,600 |
| Chrome | 9,600 | 17,000 | 17,400 |
| Chrome-iron 1 | 11,000 | 16,300 | 11,700 |
| Chrome-iron 2 | 9,100 | 16,600 | 14,600 |
| Zirconium | 9,100 | 11,000 | 12,000 |

EXAMPLE V

The as-received, untreated refractory samples A, B, C, as well as the samples impregnated in three successive cycles were tested for hot modulus of rupture. Samples A (42% $Al_2O_3$) were tested at 1350° C. and samples B (58% $Al_2O_3$) and C (70% $Al_2O_3$) were tested at 1400° C. Since the impregnation process involved heating the samples to 1,450° C. to decompose the soluble salt or oxide and allow reactions to occur, as-received brick of each type were MOR tested with and without heat treatment to see if the heat treatment itself affected strength. No significant difference was found for the 42 or 70% $Al_2O_3$. However, heat treatment alone did increase the strength of as-received 58% $Al_2O_3$ brick significantly, as shown in Table 6. Based on this, all impregnated samples were compared to the as-received samples for 42 and 70% $Al_2O_3$ brick and to the heat-treated 58% $Al_2O_3$ brick.

TABLE 6

| | Hot modulus of rupture (psi) | | |
|---|---|---|---|
| Treatment and/or additive | 42% $Al_2O_3$ 1350° C. | 58% $Al_2O_3$ 1400° C. | 70% $Al_2O_3$ 1400° C. |
| As received | 530 ± 70 | 590 ± 110 | 370 ± 50 |
| As received heat | 560 ± 120 | 820 ± 80 | 360 ± 30 |
| Calcium | 360 ± 30 | 850 ± 120 | 930 ± 80 |
| Chrome | 650 ± 100 | 1610 ± 40 | 770 ± 30 |
| Chrome-iron 1 | 790 ± 130 | 990 ± 70 | 770 ± 110 |
| Chrome-iron 2 | 840 ± 120 | 1540 ± 150 | 910 ± 100 |
| Zirconium | 600 ± 90 | 710 ± 50 | 600 ± 100 |
| Molybdenum | 940 ± 90 | 1480 ± 220 | 570 ± 90 |

From Table 6 it is noted that additions of solutions or chrome or chrome-iron resulted in two-to threefold improvements in hot MOR. Zirconium and calcium solution additions significantly improved the hot MOR of the 70% $Al_2O_3$ refractory while having little effect on the 42% and 58% $Al_2O_3$ refractories, Molybdenum solution additions significantly improved the hot MOR properties of all of the refractories, particularly the 42% and 58% $Al_2O_3$ refractories.

EXAMPLE VI

Untreated, heat treated and twice impregnated samples of alumina refractories A, B and C were subjected to severe hot load tests. Each brick was subjected to temperatures much higher than the upper use limit recommended for that particular composition. Manufacturers' hot load values shown in Table 1 were obtained for brick heated to only 1450° C. (2640° F.) (ASTM 16-77, schedule 3), as compared to temperatures of 1680° C. (3060° F.), 1725° C. (3140° F.), and 1760° C. (3195° F.) (ASTM 16-77, schedule 5) used in this evaluation for the 42, 58, and 70% $Al_2O_3$ brick, respectively. Higher temperature test conditions were used to magnify the deformation differences resulting from comparisons between treated and untreated brick. Generally, as can be seen from Table 7, the chrome additions improved the resistance to deformation under load for each type of refractory, while the addition of zirconium and calcium to the 70% $Al_2O_3$ refractory had a very deleterious effect.

TABLE 7

| | Hot load Average deformation, (%) | | |
|---|---|---|---|
| Treatment and/or additive | 42% $Al_2O_3$ 1680° C. | 58% $Al_2O_3$ 1725° C. | 70% $Al_2O_3$ 1760° C. |
| As received | 4.5 ± 0.6 | 2.2 ± 0.5 | 4.1 ± 0.3 |
| As received-heat treatment | NA | 1.1 ± 0.4 | NA |
| Calcium | NA | NA | 15.6 ± 1.7 |
| Chrome | 3.6 ± 1.0 | 2.0 ± 0.5 | 2.2 ± 0.3 |
| Chrome-iron 1 | 5.4 ± 1.1 | 2.3 ± 0.2 | 6.0 ± 0.8 |
| Chrome-iron 2 | 5.8 ± 1.3 | 3.2 ± 0.3 | 8.5 ± 0.1 |
| Zirconium | NA | NA | 9.6 ± 0.7 |

NA-not applicable

For alumina refractories used in the presence of molten slags, numerous reactions can occur, particularly at the ternary interface of refractory, slag and atmosphere. Due to the high mobility of various species in the liquid and gaseous states, chemical corrosion can be severe and rapid. Corrosion can be related, to a large extent, to the wettability of the refractory by the liquid phase. If secondary refractory oxides uniformly coat the alumina or mullite grains and reduce wettability or react to form more stable crystalline phases at grain boundaries, then the slag resistance of the alumina refractories would be greatly improved.

EXAMPLE VII

The slag resistance of as-received and twice impregnated alumina refractories A, B and C were evaluated using a rotary slag test facility. Tests were conducted using a highly reactive furnace slag having the following composition in percent by weight:

| | |
|---|---|
| CaO | 33 |
| $SiO_2$ | 33 |
| $Fe_2O_3$ | 20 |
| MgO | 5 |
| MnO | 5 |
| $Al_2O_3$ | 4 |
| | 100 |

The tests were run for 8 hours (an initial 2 hour heat up, followed by 6 hours at 1500° C., 1550°, and 1600° C. for the 42- 58-, and 70% $Al_2O_3$ brick). 400 gram slag additions were made every 10 min. during the first hour after reaching temperature, followed by 200 gram additions every 10 min. for the remaining 5 hours. Total slag introduced was 8.4 kg.

The average area change for each specimen tested was obtained in the following manner: The straight and slant side faces of each specimen were traced on a piece of white posterboard before and after testing to represent the initial and final areas of the faces. The area difference was determined using a computerized image analysis system. Average percent area change was determined by averaging the area changes for the two sides. A summary of results is given in Table 8.

TABLE 8

| | Average area change (%) | | |
|---|---|---|---|
| Treatment and/or additive | 42% $Al_2O_3$ 1500° C. | 58% $Al_2O_3$ 1550° C. | 70% $Al_2O_3$ 1600° C. |
| As received | 11.4 ± 5.0 | 10.2 ± 1.6 | 11.0 ± 0.8 |
| As received-heat treatment | ND | 9.3 ± 0.3 | ND |
| Calcium | ND | ND | 7.5 ± 1.0 |
| Chrome | 4.1 ± 0.9 | 2.2 ± 1.1 | 3.0 ± 0.4 |
| Chrome-iron 1 | 6.2 ± 1.0 | 3.0 ± 0.8 | 6.0 ± 0.9 |
| Chrome-iron 2 | 6.1 ± 1.0 | 1.6 ± 0.6 | 4.1 ± 0.2 |
| Zirconium | ND | ND | 8.1 ± 1.6 |

ND-not determined

In every case except the 70% $Al_2O_3$ brick impregnated with zirconium, statistically significant improvement in the slag resistance resulted from impregnation. Improvement was dramatic, representing twofold to fivefold improvements, for all brick impregnated with chrome-containing solutions.

The improved slag resistance can be attributed to several factors. The addition of chrome or chrome-iron mixtures to alumina-containing refractories causes increased bulk density and corresponding decreased porosity. As an example, additions of chrome or chrome-iron mixtures to a 58% $Al_2O_3$ brick increased the density from 2.45 to 2.64 g/cm$^3$. This decreased porosity reduces penetration of the brick by the liquid slag. The formation of $Al_2O_3.Cr_2O_3$ or $Al_2O_3.Fe_2O_3.Cr_2O_3$ solid solutions results in phases more chemically inert than $Al_2O_3$ to iron-containing slags. The presence of $Cr_2O_3$ also reduces the wettability of iron-containing slags, as evidenced by reduced penetration and almost no residual slag on the surface of the brick following the rotary slag test. Residual slag adhering to the untreated brick was two to three times as thick.

X-ray diffraction analysis of the treated samples of 42-, 58- and 70% $Al_2O_3$ content alumina refractories confirmed that the impregnation-heating treatment of the refractories resulted in the formation of refractory oxides and solid solutions which reduced or eliminated many of the undesirable high temperature characteristics of the untreated refractories. Mullite continued to be a major phase constituent after treatment of the refractories. The addition of solutions containing chromium resulted in the formation of $Al_2O_3.Cr_2O_3$ or $Al_2O_3.Cr_2O_3.Fe_2O_3$ solid solutions. Zirconium additions resulted in the formation of zircon ($ZrSiO_4$) and monoclinic zirconia accompanied by reduction in concentration of the cristobalite phase. Addition of calcium to the refractories likewise resulted in reduction of the cristobalite phase, most likely due to the formation of anorthite, at least in the 58- and 70% $Al_2O_3$ content refractories.

The X-ray diffraction data helps to explain inconsistencies between the hot MOR values obtained at 1400° C. and hot load data obtained at 1750° C. for 70% $Al_2O_3$ brick impregnated with calcium and zirconium. Calcium additions resulted in the formation of anorthite with a melting point of 1553° C. Hot MOR values obtained at 1400° C. were high—almost three times that of the as-received brick. However, during hot load testing the 1553° C. melting point of anorthite was greatly exceeded, resulting in a fluid liquid being formed and high deformation under load.

Zirconium additions resulted in the formation of zircon, which tied up free SiO$_2$ and resulted in high MOR values at 1400° C.—almost twice that of the as received brick. However, during hot load testing above 1600° C., the zircon dissociated into refractory zirconia and silica, which at these temperatures softened and, in the presence of other impurities (iron, titania, and alkalies), formed low-viscosity melts resulting in high deformation under load. This would indicate improved properties for these refractories when used to temperatures not exceeding 1550° C.

INDUSTRIAL APPLICABILITY

The method of the present invention has broad applicability to nearly all high temperature metallurgical, glass, cement and other high temperature processes where it is desirable to utilize alumina refractories. It has been found that the high temperature properties of alumina refractories containing 42 to 70% by weight Al$_2$O$_3$ and having apparent porosities of about 12 to 16 percent can be significantly improved by adding solutions containing chrome, chrome-iron, zirconium, calcium, or molybdenum to these refractories, drying and firing to at least about 1450° C. to achieve weight gains of from about 1 to 10 percent by weight. Impregnation had little, if any, effect on the cold compressive strength of the refractories; however, some very significant improvements were noted for the hot MOR, hot load and slag resistance of the alumina brick.

Additions of molybdenum, chrome, or chrome-iron mixtures resulted in general improvement to hot load resistance and very dramatic improvement to the hot MOR and slag resistance of all the bricks. Fivefold improvements to the slag resistance were noted due to decreased porosity, increased chemical inertness, and decreased wetting of the refractory by high-iron slags. These improvements resulted from additions as small as 3 wt. pct. Calcium and zirconium additions, which improved the hot MOR of 70% Al$_2$O$_3$ brick at 1400° C., resulted in marginal improvement in the slag resistance at 1600° C. and caused severe deformation under load at 1750° C. owing to the formation of fluid liquid phases above 1550° C. Thus, depending upon the intended usage of the treated refractory, calcium or zirconium additions could provide significant advantages.

The hot MOR, hot load, and slag resistance measurements achieved with the method of the present invention indicated that these properties, for the most part, were superior to those of untreated brick with significantly higher Al$_2$O$_3$ contents. For example, 58% Al$_2$O$_3$ brick impregnated with chrome had values two to five times better than values obtained for untreated 70% Al$_2$O$_3$ brick. This sort of improvement could reduce the dependence of the United States on imported refractory-grade bauxite which is generally required for high Al$_2$O$_3$ content brick, as domestic alumina resources treated in accordance with the present invention could be used to produce the improved refractories.

What is claimed is:

1. A method for improving the high temperature properties of relatively low Al$_2$O$_3$ content alumina refractories comprising the steps of:
   providing a porous alumina refractory containing from 42 to 70 percent by weight Al$_2$O$_3$;
   impregnating said refractory with a solution of a soluble compound, said compound containing an ion selected from the group consisting of chromium, mixtures of chromium and iron, zirconium, calcium, molybedenum and tungsten and being capable of conversion to a refractory oxide or phase on being heated to a temperature below the melting point of the alumina refractory;
   heating said impregnated refractory to a temperature of at least about 1450° C. but less than the melting point of the alumina refractory for a time sufficient to convert the impregnated compound to a refractory oxide or phase and for the refractory oxide or phase to react with the non-Al$_2$O$_3$ constitutents of said refractory for preventing or reducing the presence of high temperature property detrimental compounds or phases.

2. A method, as claimed in claim 1, wherein said step of impregnating is vacuum impregnating.

3. A method, as claimed in claim 1, wherein said step of impregnating comprises soaking said refractory in a solution containing said ion.

4. A method, as claimed in claim 1, wherein said step of impregnating comprises adding said soluble compound to a refractory dry mix prior to forming.

5. A method, as claimed in claim 1, wherein said step of impregnating comprises adding said soluble compound to a refractory castable, ramming, or gunning mix.

6. A method, as claimed in claim 1, wherein said refractory is impregnated with from 1 to 10% by weight of said soluble compound.

7. A method, as claimed in claim 6, wherein said body is impregnated with from 3 to 10% by weight of said soluble compound.

8. A method, as claimed in claims 6 or 7, wherein said ion is selected from the group consisting of molybdenum, chromium and mixtures of chromium and iron.

9. A method, as claimed in claims 6 or 7, wherein said soluble compound is selected from the soluble oxides, chlorides and nitrates of said ions.

10. A method, as claimed in claim 9, wherein said soluble compound is selected from molybdenum trioxide, chromium trioxide and mixtures of chromium trioxide and ferric chloride.

11. A method, as claimed in claim 1, wherein said refractory has an apparent porosity of from about 11 to 19 percent.

12. A method, as claimed in claim 1, wherein said refractory has an apparent porosity of from about 12 to 16 percent.

13. A relatively low Al$_2$O$_3$ content, porous, alumina refractory body comprising from 42 to 70 percent by weight Al$_2$O$_3$, balance SiO$_2$ and impurities, said body including within its pores from 1 to 10% by weight of a refractory oxide or phase of an ion selected from the group consisting of chromium, mixtures of chromium and iron, zirconium, calcium and molybdenum and characterized by high temperature property values substantially greater than the corresponding values for the same refractory body without said refractory oxide content in its pores.

14. An alumina refractory body, as claimed in claim 13, wherein said refractory oxide or phase is selected from solid solutions of Cr$_2$O$_3$.Al$_2$O$_3$ and Cr$_2$O$_3$.Fe$_2$O$_3$.Al$_2$O$_3$.

* * * * *